US009741241B2

(12) United States Patent
Mizui et al.

(10) Patent No.: US 9,741,241 B2
(45) Date of Patent: Aug. 22, 2017

(54) ELECTRONIC DEVICE

(71) Applicant: NIKON CORPORATION, Tokyo (JP)

(72) Inventors: Kengo Mizui, Zushi (JP); Hisashi Tai, Kawasaki (JP); Takafumi Toyoda, Chigasaki (JP); Mayuko Ito, Kawasaki (JP); Yuki Kinouchi, Yokohama (JP); Masakazu Sekiguchi, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 241 days.

(21) Appl. No.: 14/301,983

(22) Filed: Jun. 11, 2014

(65) Prior Publication Data

US 2014/0292512 A1 Oct. 2, 2014

Related U.S. Application Data

(63) Continuation of application No. PCT/JP2012/006343, filed on Oct. 3, 2012.

(30) Foreign Application Priority Data

Dec. 20, 2011 (JP) .................................. 2011-278275
Dec. 20, 2011 (JP) .................................. 2011-278283

(51) Int. Cl.
*G08B 1/08* (2006.01)
*G08C 17/02* (2006.01)
(Continued)

(52) U.S. Cl.
CPC .......... *G08C 17/02* (2013.01); *H04M 1/7253* (2013.01); *H04M 1/72538* (2013.01);
(Continued)

(58) Field of Classification Search
CPC .......... G08C 17/02; G08B 23/00; G08B 1/00; G08B 1/08; H04M 1/7253;
(Continued)

(56) References Cited

U.S. PATENT DOCUMENTS 5,283,644 A 2/1994 Maeno
2003/0088367 A1* 5/2003 Kim ...................... G06N 3/004
702/19
(Continued)

FOREIGN PATENT DOCUMENTS

CN 201388273 Y 1/2010
JP H0187281 U 6/1989
(Continued)

OTHER PUBLICATIONS

International Search Report issued in International Patent Application No. PCT/JP2012/006343 mailed Jan. 15, 2013.
(Continued)

*Primary Examiner* — Hung T Nguyen
(74) *Attorney, Agent, or Firm* — Oliff PLC (57) ABSTRACT

An electronic device may include a position detecting unit that detects a position; a time detecting unit that detects a time; a communicating unit that communicates with a first device provided separately from the position detecting unit and the time detecting unit; and an instructing unit that instructs, via the communicating unit, a first detecting unit provided to the first device to perform detection according to a detection result of the position detecting unit and the time detecting unit. An electronic device may include a position detecting unit that detects a position; a time detecting that detects a time; a physical amount detecting unit that detects a physical amount of an ambient environment according to a detection result position detecting unit and the time detecting unit; and a human detecting that performs detection about human according to a detection result of the physical amount detecting unit.

25 Claims, 5 Drawing Sheets

(51) Int. Cl.
*H04N 1/00* (2006.01)
*H04N 7/18* (2006.01)
*H04M 1/725* (2006.01)
*H04N 101/00* (2006.01)
*H04N 5/232* (2006.01)
*H04N 5/235* (2006.01)

(52) U.S. Cl.
CPC ..... *H04N 1/00323* (2013.01); *H04N 1/00336* (2013.01); *H04N 7/185* (2013.01); *H04M 2250/10* (2013.01); *H04M 2250/12* (2013.01); *H04M 2250/52* (2013.01); *H04N 5/2354* (2013.01); *H04N 5/23219* (2013.01); *H04N 2101/00* (2013.01); *H04N 2201/0084* (2013.01)

(58) Field of Classification Search
CPC ............ H04M 1/72538; H01M 1/0202; H04N 1/00323; H04N 1/00336
USPC .............. 340/539.11, 539.13, 540, 541, 500; 345/156, 173; 455/404.2, 411, 414.3, 455/426.1, 456.1, 456.3
See application file for complete search history.

(56) References Cited

U.S. PATENT DOCUMENTS

| | | | |
|---|---|---|---|
| 2005/0190053 A1* | 9/2005 | Dione | G06Q 10/06 340/500 |
| 2008/0090621 A1* | 4/2008 | Yokodate | H04M 1/22 455/566 |
| 2009/0148152 A1 | 6/2009 | Kurane | |
| 2010/0009699 A1* | 1/2010 | Mise | H04W 8/245 455/456.3 |
| 2010/0289756 A1* | 11/2010 | Anzures | G06F 3/0346 345/173 |
| 2010/0304730 A1* | 12/2010 | Huang | H04M 1/72572 455/419 |
| 2012/0295579 A1 | 11/2012 | Miyano et al. | |

FOREIGN PATENT DOCUMENTS

| | | |
|---|---|---|
| JP | A-2005-18126 | 1/2005 |
| JP | A-2005-217589 | 8/2005 |
| JP | 2006171951 A | 6/2006 |
| JP | 2007310531 A | 11/2007 |
| JP | 2007323436 A | 12/2007 |
| JP | A-2007-323436 | 12/2007 |
| JP | 2008252798 A | 10/2008 |
| JP | 2008282281 A | 11/2008 |
| JP | 2009009231 A | 1/2009 |
| JP | 2009080524 A | 4/2009 |
| JP | 2009253398 A | 10/2009 |
| JP | 3161846 U | 8/2010 |
| JP | 2010221958 A | 10/2010 |
| JP | 2011095067 A | 5/2011 |
| JP | A-2011-155522 | 8/2011 |
| JP | 2013131824 A | 7/2013 |

OTHER PUBLICATIONS

International Preliminary Report on Patentability issued in International Patent Application No. PCT/JP2012/006343 mailed Jun. 24, 2014.
Feb. 16, 2016 Office Action issued in Chinese Patent Application No. 201280040382.X.
Jul. 12, 2016 Office Action issued in Japanese Application No. 2015-186082.
Aug. 2, 2016 Office Action issued in Japanese Application No. 2015-186071.
Mar. 29, 2016 Office Action issued in Japanese Application No. 2011-278275.
Aug. 30, 2016 Office Action issued in Japanese Application No. 2015-186081.
Feb. 21, 2017 Office Action issued in Japanese Application No. 2015-186071.
Feb. 14, 2017 Office Action issued in Japanese Application No. 2015-186082.

* cited by examiner

ELECTRONIC DEVICE

This is a Continuation of International Application No. PCT/JP2012/006343, filed Oct. 3, 2012, which claims the benefit of Japanese Patent Application Nos. 2011-278775 and 2011-278283, both filed Dec. 20, 2011. The disclosure of the prior applications is hereby incorporated by reference herein in its entirety.

TECHNICAL FIELD

The present invention relates to an electronic device.

RELATED ART

It has been conventionally proposed to take security measures by using a mobile communication device to determine whether a current position is a danger zone and to show a proper route (for example, Patent Document No 1).
Patent Document No. 1, Japanese Patent Application Publication No. 2011-155522

SUMMARY

However, such a danger zone varies depending on the time and situation, and accordingly, a security system using a conventional mobile communication device has not been convenient to use.

According to a first aspect of the present invention, an electronic device includes: a position detecting unit that detects a position; a time detecting unit that detects a time; a communicating unit that communicates with a first device provided separately from the position detecting unit and the time detecting unit; and an instructing unit that instructs, via the communicating unit, a first detecting unit provided to the first device to perform detection according to a detection result of the position detecting unit and the time detecting unit.

According to a second aspect of the present invention, an electronic device includes: a position detecting unit that detects a position; a time detecting unit that detects a time; a physical amount detecting unit that detects a physical amount of an ambient environment according to a detection result of the position detecting unit and the time detecting unit; and a human detecting that performs human detection according to a detection result of the physical amount detecting unit.

According to a third aspect of the present invention, an electronic device includes: a first detecting unit that detects brightness; a second detecting unit that detects sound; and a third detecting unit that detects information for human detection according to a detection result of the first detecting unit and the second detecting unit.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
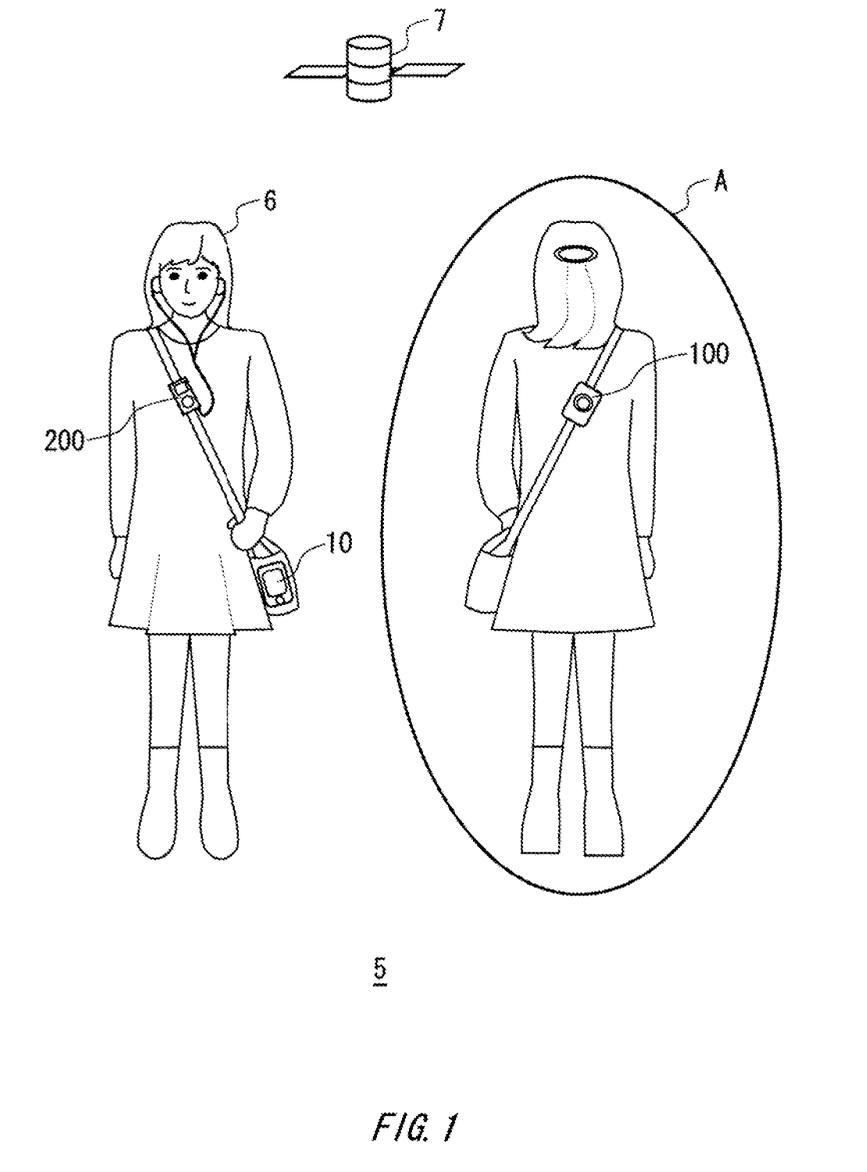
FIG. 1 shows an example of a use environment of a system 5 according to an embodiment.

FIG. 1 shows an example of a use environment of a system 5 according to an embodiment. The system 5 includes a smartphone 10, a camera unit 100, a music player 200, and a GPS satellite 7. In the system 5, the smartphone 10 is provided in a bag, and the camera unit 100 and the music player 200 are attached to the bag. The part A shows a view of a user 6 seen from behind. The smartphone 10 communicates with the camera unit 100 wirelessly. Also, the smartphone 10 communicates with the music player 200, which is different from the camera unit 100, wirelessly. Specifically, the smartphone 10 controls the camera unit 100 and the music player 200 wirelessly. The camera unit 100 wirelessly notifies the smartphone 10 of a detection result of various sensors provided to the camera unit 100.

The smartphone 10 receives GPS signals transmitted from the GPS satellite 7 and calculates latitude information and longitude information based on the received GPS signals to detect the current position of the user 6. Also, the smartphone 10 detects the current time by using a clock function thereof. When it is determined that the user 6 is on a road based on the current position, and it is nighttime based on the current time, the smartphone 10 activates the camera unit 100 to start detection of the ambient environment. Specifically, the smartphone 10 makes the camera unit 100 detect the brightness and sound of the ambient environment.

When it is determined that the brightness detected by the camera unit 100 is equal to or less than a predetermined brightness, and the volume of sound detected by the camera unit 100 is smaller than a predetermined volume, the smartphone 10 makes the camera unit 100 detect an approaching person with an infrared ray and the like. When the present or absence of an approaching person is determined based on the detection result of the camera unit 100, and it is determined that there is an approaching person, the smartphone 10 instructs the camera unit 100 to capture an image of the approaching person. The smartphone 10 detects the person in an image captured by the camera unit 100. For example, when a stranger or a person on a blacklist is detected in the image, the smartphone 10 notifies the user 6 by vibration function of the smartphone 10. Also, the smartphone 10 notifies the user 6 by turning down the volume of sound output from the music player 200.

With use of the system 5, the detection operation of the camera unit 100 can be controlled based on the position and time. Accordingly, for example when the user 6 is at a location that becomes dangerous at nighttime, the detection operation of the camera unit 100 can be started at nighttime. Also, with use of the system 5, information for human detection can be detected by the camera unit 100, for example when the ambient environment becomes dark and quiet. In this manner, with use of the system 5, sensing of the ambient environment can be started at an appropriate timing even in an area where the degree of dangerousness varies depending on the time and situation. Accordingly, a security system that is convenient for a user to use can be provided.

Figure 2:
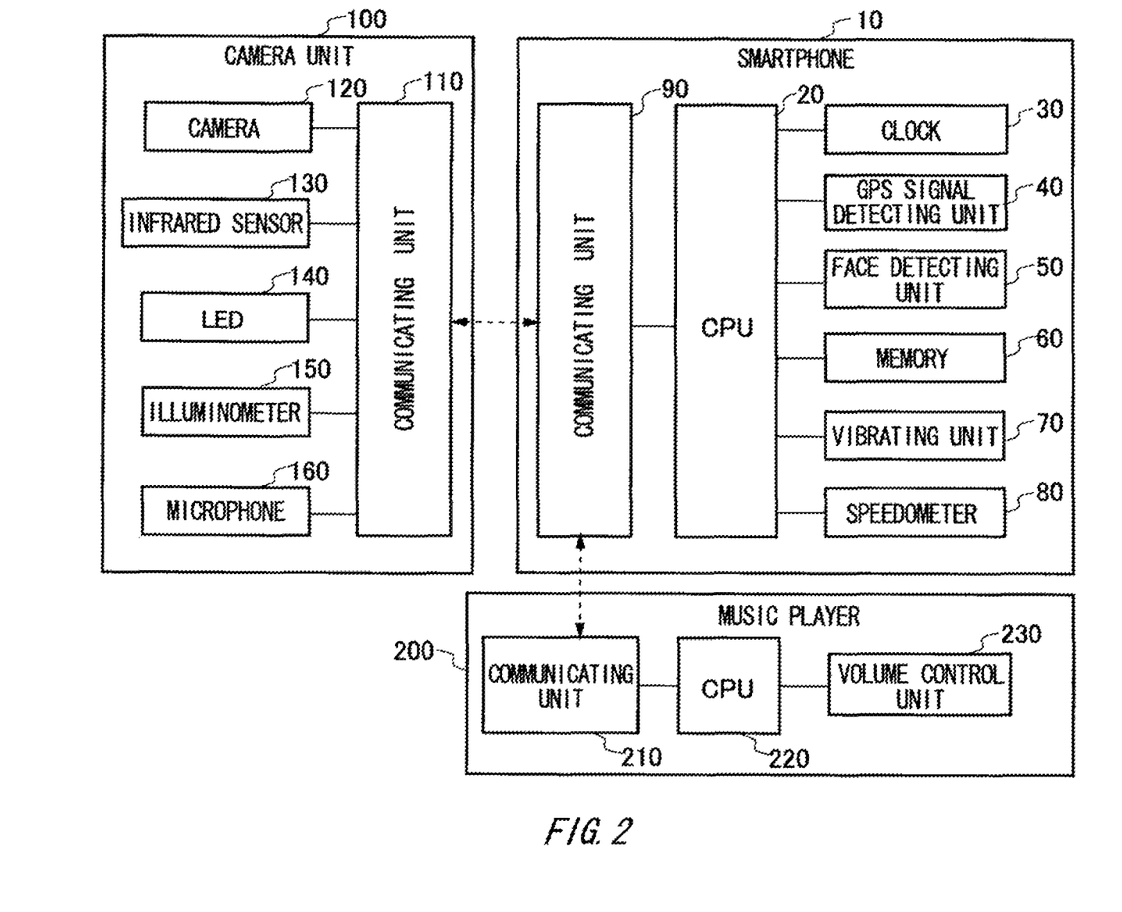
FIG. 2 schematically shows an example of functional blocks functional of smartphone 10, a camera unit 100, and a music player 200.

FIG. 2 schematically shows an example of functional blocks of the smartphone 10, the camera unit 100, and the music player 200. Here, functions and operations of the system 5 are shown with the functional blocks.

First, the functional configuration of the smartphone 10 is explained. The smartphone 10 has a CPU 20, a clock 30, a GPS signal detecting unit 40, a face detecting unit 50, a memory 60, a vibrating unit 70, a speedometer 80, and a communicating unit 90.

The clock 30 measures the date and time, and outputs date/time data indicating the measured date and time to the CPU 20. The clock 30 is an example of a time detecting unit that detects the time. The GPS signal detecting unit 40 detects GPS signals transmitted from the GPS satellite 7, and outputs GPS data indicating the detected GPS signals to the CPU 20. The CPU 20 calculates latitude information and longitude information based on the GPS data detected by the GPS signal detecting unit 40. The GPS signal detecting unit 40 is an example of a position detecting unit that detects a position.

The face detecting unit 50 recognizes a face in image data. Specifically, the face detecting unit 50 recognizes a face in image data of an image captured by the camera unit 100. For example, the face detecting unit 50 detects at face of a stranger or a person on a blacklist in image data of an image captured by the camera unit 100. The face detecting unit 50 outputs face detection data indicating the detection result of a face to the CPU 20.

The speedometer 80 detects the moving speed of the user 6. For example, the speedometer 80 may include an acceleration sensor, and detect the walking speed of the user 6 based on acceleration information detected by the acceleration sensor. For example, the speedometer 80 detects vibration caused by the user 6 who is walking, and detects steps per unit time based on the vibration. The steps per unit time may be used as an index value of the walking speed of the user 6. The speedometer 80 outputs speed data indicating the detected moving speed to the CPU 20. The speedometer 80 is an example of a speed detecting unit that detects the walking speed of the user 6. The CPU 20 functions as a speed acquiring unit that acquires the walking speed of the user 6. The CPU 20 may detect the moving speed of the user 6 based on a temporal change in current positions based on the GPS information detected by the GPS signal detection unit 40. Purposes of detecting the moving speed of the user 6 in this manner are to detect the normal walking speed (average walking speed) of the user 6, and to detect whether the current walking speed of the user 6 is faster or slower than the detected normal walking speed (average walking speed). A reason for performing such detection is because when the walking speed of the user 6 is slower than the normal walking speed when the user 6 is tired or concentrating on listening to music from the music player 200, the user 6 is more likely to be caught in crimes due to lack of attention to the ambient environment.

The vibrating unit 70 vibrates to notify the user 6 of a danger. The vibrating unit 70 vibrates under control of the CPU 20. The vibrating unit 70 as an example of a driving unit may include a vibrating unit that vibrates under control of the CPU 20. Examples of the vibrating unit include a vibration motor. The CPU 20 makes the vibrating unit 70 vibrate according to a detection result of a plurality of detecting units such as the clock 30, the GPS signal detecting unit 40, the face detecting unit 50, and sensors provided to the camera unit 100. In this manner, the vibrating unit 70 vibrates according to a detection result of a plurality of detecting units. The vibrating unit 70 is an example of the driving unit that drives according to a detection result of a plurality of detecting units.

The communicating unit 90 communicates with the camera unit 100. Also, the communicating unit 90 communicates with the music player 200, which is different from the camera unit 100. The communicating unit 90 modulates transmission data generated by the CPU 20, and outputs the modulated data to the outside with wireless signals. Also, the communicating unit 90 demodulates the received wireless signals to generate reception data, and outputs the reception data to the CPU 20. In this manner, communicating unit 90 can communicate with the camera unit 100 that is provided separately from the GPS signal detecting unit 40 and the clock 30.

The CPU 20 controls the entire operations of the smartphone 10 and controls to notify the user 6 of a danger. The CPU 20 functions as an instructing unit that instructs, via the communicating unit 90, at least one sensor that is provided to the camera unit 100 to perform detection according to a detection result of the GPS signal detecting unit 40 and the clock 30. For example, the CPU 20 performs control based on data detected by various sensors such as the clock 30, the GPS signal detecting unit 40, the face detecting unit 50, and the speedometer 80. Specifically, the CPU 20 generates transmission data for controlling the camera unit 100 and the music player 200 based on the date/time data, the GPS data, the face detection data, the speed data, and the like. Also, the CPU 20 controls the face detecting unit 50 and the vibrating unit 70 based on the reception data received by the communicating unit 90.

The memory 60 is a nonvolatile memory (such as a flash memory), and stores therein data necessary for each unit of the smartphone 10 to perform operations. For example, the memory 60 stores therein programs such as an operating system operated by the CPU 20, various parameters, and the like. Also, the memory 60 stores therein map information. For example, the memory 60 stores therein, in association with positions indicated by latitude/longitude information and the like, map information including various types of information about constructions such as buildings and roads located at the position. The map information may include data relating to road width. Also, the memory 60 stores therein data of facial information to be used in facial recognition by the face detecting unit 50. In this case, the facial data stored in the memory 60 may be stored by being classified into faces of acquaintances and people on a blacklist. A reason for such storage is, as described below, because the CPU 20 notifies the user 6 of a person approaching from behind as an acquaintance, as a person on a blacklist, or as a stranger. The face detecting unit 50 compares the data of facial information stored in the memory 60 with image data of an image captured by the camera unit 100 to recognize a face.

Also, the memory 60 stores therein various kinds of detection data detected by the clock 30, the GPS signal detecting unit 40, the face detecting unit 50, and the speedometer 80. Also, the memory 60 stores therein transmission data transmitted from the communicating unit 90, and reception data received by the communicating unit 90.

Next, the functional configuration of the camera unit 100 is explained. The cameras unit 100 is provided separately from the smartphone 10, and functions as a sensor unit that performs communication with the smartphone 10. The camera unit 100 has a camera 120, an infrared sensor 130, an LED 140, an illuminometer 150, a microphone 160, and a communicating unit 110. In the present embodiment, because the camera unit 100 is provided behind the user 6 as shown in FIG. 1, the camera 120, the infrared sensor 130, the illuminometer 150, and the microphone 160 function as sensors that acquire information about the back of the user 6. The camera 120, the infrared sensor 130, the LED 140, the illuminometer 150, and the microphone 160 may collectively be referred to as a sensor. To make the camera unit 100 attachable to and detachable from the smartphone 10, an engaging part that engages mechanically and electrically with the smartphone 10 may be provided to the camera unit 100. When the camera unit 100 is engaged with the smartphone 10, the camera unit 100 may be used as an image capturing unit of the smartphone 10. Also, the smartphone 10 and the camera unit 100 may be integrated, and the smartphone 10 may be attached to the back of the user 6. In this case, the communicating units 90, 110 may be omitted.

The communicating unit 110 communicates with an external device. Specifically, the communicating unit 110 receives data transmitted from the communicating unit 90. The communicating unit 110 demodulates received wireless signals to generate reception data. The communicating unit 110 outputs, based on the reception data, signals to control sensors provided to the camera unit 100. For example, each sensor starts detection operations upon receiving signals that instruct to start the detection operations. Also, the LED 140 starts light emission upon receiving signals that instruct to start the light emission.

The illuminometer 150 is a physical amount sensor that detects illuminance. The illuminometer 150 is an example of a detecting unit that detects brightness. With use of the illuminometer 150, the brightness of a location of the user 6 can be detected. The microphone 160 is a physical amount sensor that detects sound of the ambient environment, and outputs data indicating the detected sound to the communicating unit 110. The microphone 160 is an example of a detecting unit that detects sound. With use of the microphone 160, sound of a location of the user 6 can be detected.

The communicating unit 110 modulates transmission data including data acquired from each sensor provided to the camera unit 100 to send the modulated data to the outside with wireless signals. For example, the communicating unit 110 sends transmission data to the camera unit 100 with wireless signals.

The infrared sensor 130 is an example of a detecting unit that detects information for detecting an approach of a person. The infrared sensor 130 detects an infrared ray, and outputs data indicating the intensity of the infrared ray to the communicating unit 110. The infrared sensor 130 may be a pyroelectric sensor. Also, the infrared sensor 130 may be a two-dimensional infrared sensor. The detection system may be an active system or a passive system. The infrared sensor 130 performs detection based on a detection result of the illuminometer 150 and the microphone 160.

The camera 120 captures an image of a subject to generate image data. The camera 120 outputs the generated image data to the communicating unit 110. The camera 120 is an example of an image capturing unit. The camera 120 may be a highly sensitive camera. Also, the camera 120 may be an infrared camera. The camera 120 performs detection according to a detection result of the illuminometer 150 and the microphone 160. The camera 120 is an example of a detecting unit that detects information for performing human detection. The camera 120 captures an image when an approach of a person is detected by the infrared sensor 130.

The LED 140 operates based on signals received from the communicating unit 110. Examples of signals supplied to the LED 140 include signals indicating a light emission intensity, signals indicating a light emission color, signals indicating a temporal change of at least one of a light emission intensity and a light emission color. The LED 140 is an example of an output unit. Examples of the output unit include, other than a light emitting unit like the LED 140, an audio output unit that outputs sound and the like. The LED 140 emits light when an approach of a person is detected by the infrared sensor 130.

As described above, the camera unit 100 (sensor unit) according to the present embodiment does not have a memory. This is to prevent leakage of personal information of the user 6 even when the user 6 has lost the camera unit 100 (sensor unit) or has had the camera unit 100 stolen. When a memory (e.g., a buffer memory) is provided to the camera unit 100 (sensor unit), it may be configured to delete data within the memory in a case data is transmitted by the communicating unit 110 or after an elapse of a predetermined length of time (e.g. about several hours), or it may be configured to delete data within the memory in response to an illustrated casing of the camera unit 100 being opened. Also, a display unit may not be provided to the camera unit 100 (sensor unit) so that data stored in the memory cannot be displayed.

The CPU 20 instructs control of the music player 200 according to communication with the camera unit 100. Specifically, the CPU 20 instructs control of the music player 200 according to outputs of each sensor of the camera unit 100, the outputs being acquired from the camera unit 100 through communication.

The functional configuration of the music player 200 is explained. The music player 200 has a CPU 220, a volume control unit 230, and a communicating unit 210.

The communicating unit 210 communicates with the smartphone 10. The volume control unit 230 controls, under control of the CPU 220, the volume of sound output from the music player 200. Specifically, the volume control unit 230 turns down the volume of sound output from the music player 200. The volume control unit 230 may stop outputs of sound from the music player 200 temporarily for a predetermined period.

Specifically, the communicating unit 210 receives data transmitted from the communicating unit 90. The communicating unit 210 demodulates received wireless signals to generate reception data and outputs the reception data to the CPU 220. The CPU 220 controls the volume control unit 230 based on the reception data. For example, the CPU 220 outputs signals to control the volume to the volume control unit 230. Also, the CPU 220 outputs, to the communicating unit 210, transmission data addressed to the smartphone 10. The communicating unit 210 demodulates the received transmission data, and outputs the transmission data to the outside with wireless signals. Examples of the transmission data addressed to the smartphone 10 include information about the current volume.

Various types of wireless communication in compliance with wireless communication standards, such as a short-distance wireless communication standard like Bluetooth (registered trademark), may be used for the communication of the communicating unit 90, the communicating unit 110, and the communicating unit 210.

Figure 3:
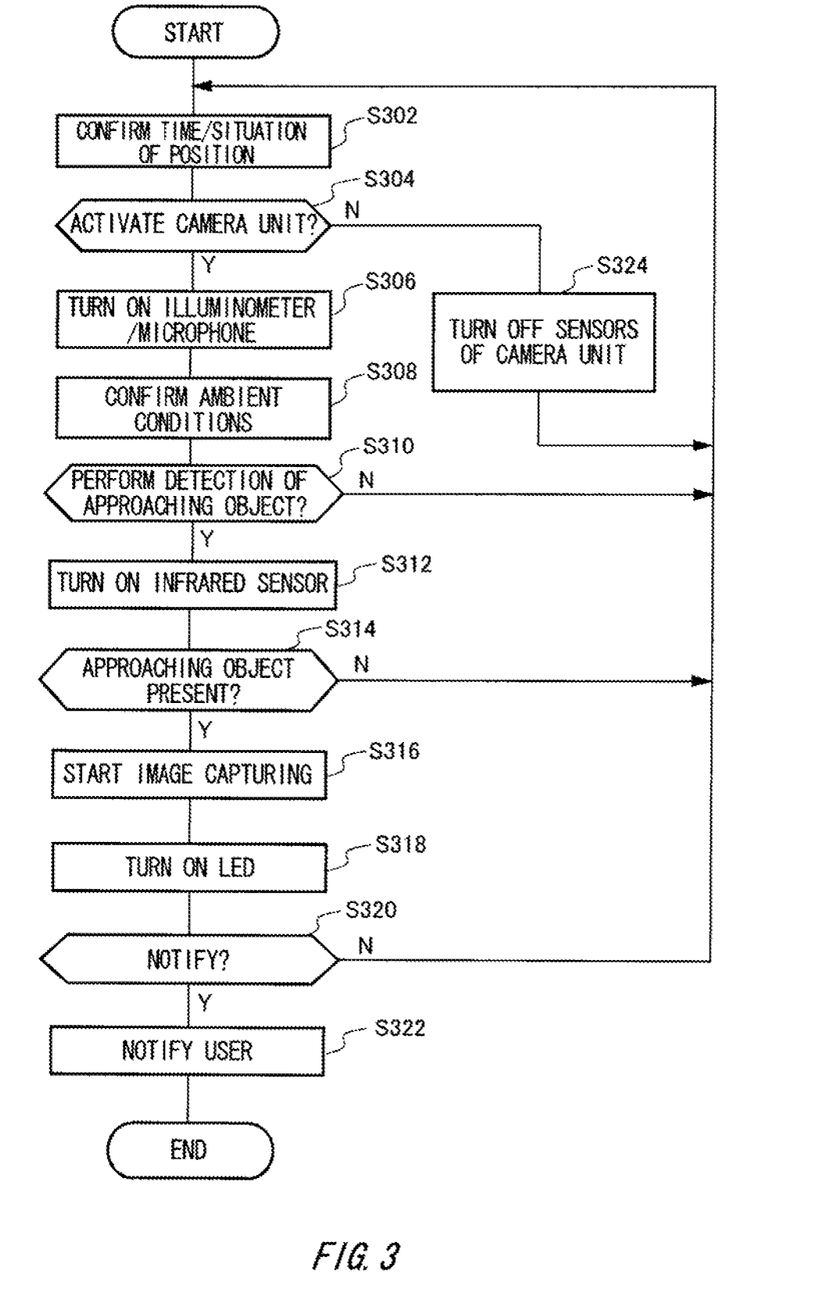
FIG. 3 shows an example of a flow of processing executed by the system 5.

FIG. 3 shows an example of a flow of processing executed by the system 5. At Step S302, the CPU 20 of the smartphone 10 acquires date/time data from the clock 30, and acquires GPS data from the GPS signal detecting unit 40 to confirm the current time and situation of the position. Specifically, the CPU 20 specifies the current time based on the date/time data. Also, the CPU 20 specifies the current position based on the GPS data. Also, the CPU 20 acquires map information stored in the memory 60. The map information includes road information such as information about a road width. The CPU 20 specifies the type of a construction located at the current position based on the map information and the current position. Also, when the current position is on a road, the CPU 20 may specify a road width of the current position based on the map information.

At Step S304, the CPU 20 determines whether to activate the camera unit 100. For example, the CPU 20 determines whether to activate the camera unit 100 based on the current time and current position. Details of this processing are explained in conjuncture with FIG. 4.

When it is determined, in the determination at Step S304, to activate the camera unit 100, the illuminometer 150 and the microphone 160 are turned on, and detection by the illuminometer 150 and the microphone 160 is started (Step S306). Specifically, the CPU 20 makes the communicating unit 90 transmit, via wireless communication, transmission data to the camera unit 100 to instruct to turn on the illuminometer 150 and the microphone 160.

Subsequently, at Step S308, the CPU 20 confirms ambient conditions. Specifically, the CPU 20 acquires, from the camera unit 100 via wireless communication, data indicating the illuminance detected b the illuminometer 150 and data indicating the sound detected by the microphone 160.

At Step S310, the CPU 20 determines whether to perform detection of an approaching object. Specifically, the CPU 20 determines whether to execute detection of an approaching object based on the result of confirmation at Step S308. Details of this processing are explained in conjuncture with FIG. 5.

When it is determined, in the determination at Step S310, to execute detection of an approaching object from behind the user 6, the camera unit 100 turns on the infrared sensor 130, and starts detection of an approaching object by the infrared sensor 130 (Step S312). Specifically, the CPU 20 makes the communicating unit 90 transmit, via wireless communication, transmission data to the camera unit 100 to instruct to turn on the infrared sensor 130. The infrared sensor 130 starts detection according to a detection result of the illuminometer 150 and the microphone 160.

Subsequently, at Step S314, the CPU 20 judges the presence or absence of an approaching object. For example, the CPU 20 judges the presence or absence of an approaching object based on detection data of the infrared sensor 130 acquired from the camera unit 100 via wireless communication. For example, the CPU 20 judges the presence or absence of an approaching object based on a temporal change of the detection data of the infrared sensor 130. For example, the CPU 20 judges the presence or absence of an approaching object based on a temporal change in infrared intensity. When the infrared intensity has increased temporally, the CPU 20 determines that an approaching object is present. Also, when the infrared sensor 130 is a two-dimensional infrared sensor, the CPU 20 judges the presence or absence of an approaching object based on a temporal change in luminance information of a two-dimensional infrared ray. For example, the present or absence of an approaching object is determined based on a temporal change in the size of an object extracted from an infrared image. More specifically, when the size of an object with a predetermined shape increases temporally, it is determined that an approaching object is present.

When it is determined, in the determination at Step S314, that there is an approaching object, the camera unit 100 starts image capturing (Step S316). Specifically, the CPU 20 makes the communicating unit 90 transmit, via wireless communication, transmission data to the camera unit 100 to instruct the camera 120 to start image capturing. In this manner, the CPU 20 instructs the camera 120, which is a detecting unit different from the illuminometer 150, the microphone 160, and the infrared sensor 130, to perform detection according to a detection result of the infrared sensor 130.

Subsequently, the camera unit 100 turns on the LED 140 (Step S318). Specifically, the CPU 20 makes the communicating unit 90 transmit, via wireless communication, transmission data to the camera unit 100 to instruct to turn on the LED 140. The CPU 20 may turn on the LED 140 at 50% of the maximum light emission intensity of the LED 140. The CPU 20 may make transmission data including information indicating a light emission intensity at which the LED 140 emits light transmitted. Also, the CPU 20 may make transmission data to instruct a light emission pattern of the LED 140 transmitted to the camera unit 100. In this manner, the CPU 20 can instruct outputs of the LED 140 according to a detection result of sensors such as the clock 30, the face detecting unit 50, the illuminometer 150, the microphone 160, the infrared sensor 130, and the camera 120. In particular, the LED 140 is configured to emit light according to detection result of the infrared sensor 130, for example when an approaching object is detected by the infrared sensor 130. Accordingly, with the LED 140 configured to emit light at an appropriate timing according to the situation of the ambient environment, the user 6 can be notified of an approaching person from behind the user 6. Also, by turning on the LED 140 when capturing an image with the camera 100, the CPU 20 can inform people around that the image capturing is not performed secretly.

Subsequently, at Step S320, it is determined whether to execute notification to the user 6. Specifically, the CPU 20 acquires, from the camera unit 100 via wireless communication, image data acquired by capturing an image with the camera 120, and determines to execute notification to the user 6 when it is judged, based on the acquired image data, that an approaching object is a stranger whose face is not stored in face data in the memory 60 or that an approaching object is a person on a blacklist registered in the memory 60.

When it is determined, in the determination at Step S320, to perform notification to the user 6, notification to the user 6 is performed (Step S322), and the process ends. For example, at Step S322, the CPU 20 makes the vibrating unit 70 vibrate. Also, the CPU 20 notifies the user 6 by turning down the volume of the music player 200. Specifically, the CPU 20 makes the communicating unit 90 transmit, via wireless communication, transmission data to the music player 200 to instruct to turn down the volume. The CPU 20 may turn down the volume of the music player 200 under a condition that the current volume of sound output from the music player 200 is equal to or larger than a predetermined volume. Also, the CPU 20 may make an externally mounted speaker provided to the music player 200 output sound to the outside.

When it is determined, in the determination at Step S320, not to perform notification to the user 6, the process proceeds to Step S302. Also, when it is determined, in the determination at Step S310 of this process flow, not to execute detection of an approaching object, the process proceeds to Step S302. Also, when it is determined, in the determination at Step S314 of this process flow, that there is not an approaching object, the process proceeds to Step S302. Also, when it is determined, in the determination at Step S304 of this process flow, not to activate the camera unit 100, the camera 120, the infrared sensor 130, the illuminometer 150, and the microphone 160 provided to the camera unit 100 are turned off (Step S324), and the process proceeds to Step S302.

Figure 4:
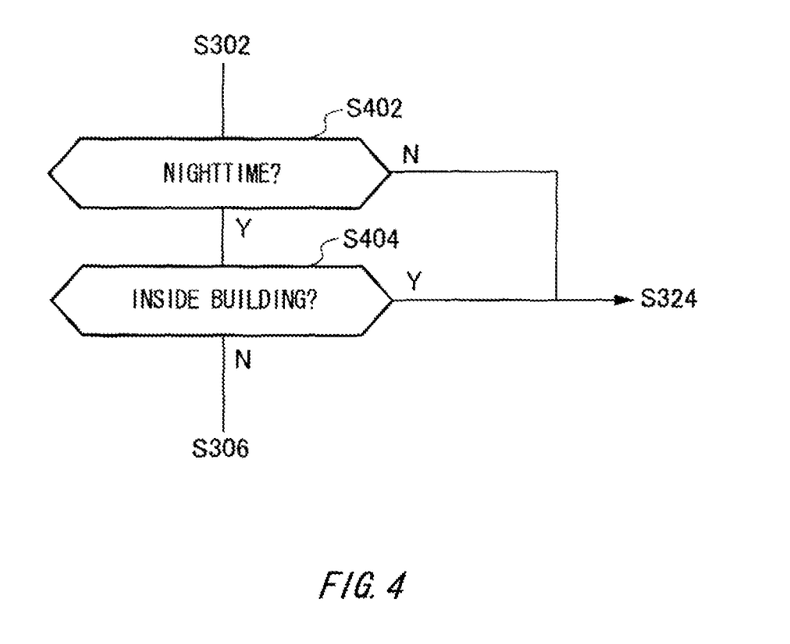
FIG. 4 shows an example of a flow of processing executed at Step S304.

FIG. 4 shows an example of a flow of processing executed at Step S304. Following Step S302, the CPU 20 determines whether it is nighttime based on the current time (Step S402). For example, the CPU 20 determines that it is nighttime when the current time is or is after 19 o'clock. Also, the CPU 20 determines that it is nighttime when the current time is or is before 6 o'clock. In this manner, the CPU 20 determines that it is nighttime when the current time belongs to a predetermined night time zone.

When it is determined, at Step S402 that it is nighttime, it is determined whether the current position is inside any building (Step S404). Specifically, the CPU 20 determines whether the current position is inside any building based on the current position and the map information stored in the memory 60. When it is determined that the current position is not inside any building at Step S404, the process proceeds to Step S306. When it is determined that the current position is inside any building at Step S404, the process proceeds to Step S324. When it is determined at Step S402 that it is not nighttime also, the process proceeds to Step S324.

In this manner, the CPU 20 determines to activate the camera unit 100 when it is determined that it is nighttime and the user 6 is outside buildings. Accordingly, it is possible to activate the camera unit 100 at an appropriate timing and make the illuminometer 150 and the microphone 160 start detection by utilizing time and location information. In this manner, the CPU 20 instructs, via the communicating unit 90, the illuminometer 150 and the microphone 160 provided to the camera unit 100 to perform detection according to a detection result about the position and a detection result about the time.

At Step S404, in addition to determining whether the user 6 is inside any building, the CPU 20 may determine whether a road width of the current position is equal to or larger than a predetermined value (e.g. several meters). When it is determined that the road width of the current position is not equal to or larger than the predetermined value, the process may proceeds to Step S306. When it is determined that the road width of the current position is smaller than the predetermined value, the process may proceeds to Step S306. In this manner, the CPU 20 can instruct the illuminometer 150 to perform detection based on data relating to a road width. Also, the CPU 20 can instruct the microphone 160 to perform detection based on data relating to a road width. A reason for such instruction is because crimes like bag-snatching often occur when the user 6 makes a turn from a wide road to a narrow road. Accordingly, the CPU 20 may proceed with the processing at Step S306 when the user 6 moves from a relatively wide road to a relatively narrow road based on a detection result of the GPS signal detecting unit 40 and data relating to road widths stored in the memory 60. In this case, the CPU 20 may proceed with the Step S306 when the user 6 walks at a speed which is approximately equal to or slower than a normal walking speed (average walking speed), and may not proceed with the processing of Step S306 when the user 6 walks at a speed which is faster than a normal walking speeds (average walking speed).

Also, the CPU 20 may end the process flow shown in FIG. 3 when the user 6 moves from a narrow road to a wide road, or when the user 6 walks at a speed which is faster than a normal walking speed (average walking speed) by approximately 15%.

Figure 5:
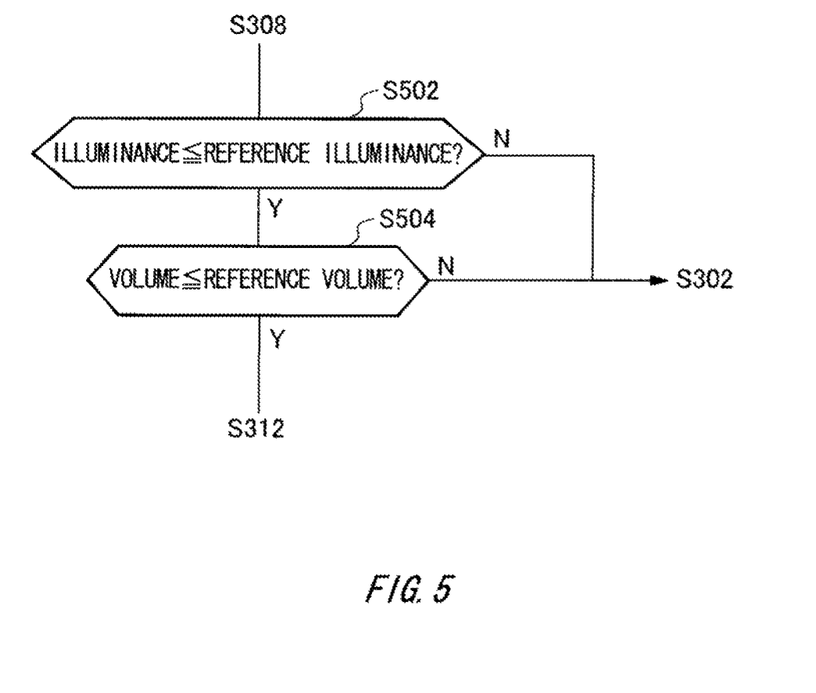
FIG. 5 shows an example of a flow of processing executed at Step S310.

FIG. 5 shows an example of a flow of processing executed at Step S310. Following Step S308, the CPU 20 determines whether the illuminance detected by the illuminometer 150 is equal to or lower than a predetermined reference illuminance (Step S502). When it is determined that the illuminance is equal to or lower than the reference illuminance at Step S502, it is determined at Step S504 whether the volume of sound detected by the microphone 160 is equal to or larger than a predetermined reference value (Step S504). When it is determined, in the determination at Step S504, that the detected volume is equal to or smaller than the predetermined reference value, the process proceeds to Step S312.

Also, when it is determined, in the determination at Step S504, that the detected volume exceeds the predetermined reference value, the process proceeds to Step S302. When it is determined, in the determination at Step S502, that the detected illuminance exceeds the predetermined reference illuminance, the process proceeds to Step S302.

In this manner, the CPU 20 determines to make the infrared sensor 130 perform detection of an approaching object when the detected illuminance is equal to or lower than the predetermined reference illumination, and the detected volume is equal to or lower than the predetermined reference volume. Accordingly, the infrared sensor 130 can detect information for performing human detection when the illuminometer 150 detects brightness equal to or lower than a predetermined brightness, and the microphone 160 detects a volume equal to or lower than a predetermined value. Accordingly, detection of an approaching object can be started at an appropriate timing such as when the location becomes dark and quiet. In this manner, the CPU 20 instructs the infrared sensor 130, which is different from the illuminometer 150, to perform detection according to a detection result of the illuminometer 150. Also, the CPU 20 instructs the infrared sensor 130, which is different from the illuminometer 150 and the microphone 160, to perform detection according to a detection result of the microphone 160.

In this example, the infrared sensor 130 is configured to perform detection when brightness equal to or lower than a predetermined brightness is detected, and a volume equal to or lower than a predetermined volume is detected. However, the CPU 20 may make the infrared sensor 130 perform detection according to types of sound detected by the microphone 160. For example, the CPU 20 may make the infrared sensor 130 perform detection when sound having a frequency satisfying a predetermined condition is detected. Examples of such a frequency satisfying a predetermined condition include a frequency of footsteps such as those generated from shoes. Also, examples of such a frequency satisfying a predetermined condition include frequencies of an engine sound or a motor sound of vehicles such as a train and a motorcycle, and a running or driving sound of the vehicles. A purpose of such detection is to detect a state where the ambient sound (e.g. scream) is drowned out by noises of a train and the like, in addition to a rapid approach of a motorcycle. That is the infrared sensor 130 may detect information for performing human detection when the illuminometer 150 detects brightness equal to or lower than a predetermined brightness, and the microphone 160 detects a predetermined type of sound.

Also, the CPU 20 may make infrared sensor 130 perform detection when there is a predetermined change in brightness, or there is a predetermined change in sound. That is, the infrared sensor 130 may detect information for performing human detection when there is a predetermined change in brightness detected by the illuminometer 150, or there is a predetermined change in sound detected by the microphone 160. For example, the infrared sensor 130 may be configured to perform detection when it becomes bright suddenly, or sound becomes loud suddenly. Accordingly, detection by the infrared sensor 130 can be started by appropriately detecting a change in the ambient environment that can be caused by a vehicle such as a train and a motorcycle.

With use of the system 5, detection by sensors that detect the ambient environment can be started at an appropriate timing even in an area where a risk varies depending on the time and situation. In addition, detection by sensors can be started sequentially at an appropriate timing according to a detection result of the other sensors that have started detection. Then, a detection result can be notified to the user 6 at a necessary timing according to a detection result of the various sensors. Accordingly, a security system that is convenient for a user to use can be provided.

In the explanation above, the infrared sensor 130 is illustrated as an example of a detecting unit for detecting an approach of a person. Various types of sensors other than the infrared sensor 130, such as a ultrasonic sensor, can be used as a detecting unit for detecting an approach of a person. Also, various types of sensors that can measure positions and distances can be used as the detecting unit. For example, a laser distance measuring sensor and the like can be used as the detecting unit.

Also, although the smartphone 10 includes the speedometer 80 in the explanation above, a speedometer may be provided to an external device other than the smartphone 10, such as the camera unit 100. Then, the smartphone 10 may acquire information indicating a speed measured by the external device through communication.

Also, in the explanation above, the CPU 20 acquires and analyzes a detection result of each sensor provided to the camera unit 100, and detection operations of each sensor of the camera unit 100 are controlled by instructions of the CPU 20. However, the camera unit 100 may have the functions of the CPU 20. For example, a detection result of the illuminometer 150 and the microphone 160 may be analyzed in the camera unit 100, and the infrared sensor 130 may be configured to perform detection according to the analysis result.

The processing explained as the operations of the CPU 20 in the explanation above is realized by the CPU 20 controlling each hardware provided to the smartphone 10 according to a program. The processing explained as the operations of the CPU 220 is realized by the CPU 220 controlling each hardware provided to the music player 200 according to a program. The same applies to the functions of the camera unit 100. That is, the processing explained in conjuncture with the smartphone 10, the camera unit 100, the music player 200, and the like according to the present embodiment can be realized by each hardware, including a processor and a memory, and a program working together to operate where the processor operates according to the program and controls each hardware. That is, the processing may be realized by a so-called computer device. The computer device may load a program to control execution of the above-described processing, and operate according to the loaded program to execute the processing. The computer device may load the program from a computer-readable recording medium that stores therein the program.

The functions of the smartphone 10 may be incorporated into various types of electronic devices. For example, without being limited to a smartphone, the functions of the smartphone 10 may be incorporated into a mobile phone, a portable information terminal such as a PDA, a portable game device, a personal computer including a tablet, a camera, a video camera, an audio recorder, a clock, and the like. Also, the functions of the smartphone 10 may be incorporated into the music player 200 itself. Also, the functions of the camera unit 100 may be incorporated into various types of electronic devices. For example, by incorporating the functions of the camera unit 100 into an accessory such as a hair clip, the accessory can be used as the electronic device. A part of the sensors of the camera unit 100 that have detection functions may be provided to an electronic device separated from an electronic device to which other sensors are provided. For example, the functions of the camera 120 may be provided to an electronic device separated from other sensors. At least the camera 120 among the functions of the camera unit 100 is preferably provided at a position where the camera 120 can capture an image behind the user 6. Also, the infrared sensor 130 is preferably provided at a position where the infrared sensor 130 can at least perform detection behind the user 6. However, needless to say, the range of detection by the camera 120 and the infrared sensor 130 is not limited to the back of the user 6. Also, the music player 200 is not limited to an electronic device used for reproduction of music. The functions of the music player 200 may be incorporated into various types of audio reproducing devices such as an audio recorder with an audio reproducing function.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to,""before," or the like and as long as the output from a previous process is not used in a later process. Even if the process flow is described using phrases such as "first" or "next" in the claims, embodiments, or diagrams, it does not necessarily mean that the process must be performed in this order.

DESCRIPTION OF REFERENCE NUMERALS 5 system
6 user
7 GPS satellite
10 smartphone
20 CPU
30 clock
40 GPS signal detecting unit
50 face detecting unit
60 memory
70 vibrating unit
80 speedometer
90 communicating unit
100 camera unit
110 communicating unit
120 camera
130 infrared sensor
140 LED
150 illuminometer 160 microphone
200 music player
220 CPU
230 volume control unit
210 communicating unit

What is claimed is:

1. An electronic device comprising:
a position detecting unit that detects a position of the electronic device;
a time detecting unit that detects a time of the electronic device;
a communicating unit that communicates with a first device that is provided separately from the position detecting unit and the time detecting unit; and
an instructing unit that instructs, via the communicating unit, a first detecting unit provided to the first device to perform detection according to a detection result of the position detecting unit and the time detecting unit.

2. The electronic device according to claim 1, comprising a storing unit that stores data relating to road width, wherein the instructing unit instructs the first detecting unit to perform detection based on the data relating to road width.

3. The electronic device according to claim 1, wherein the instructing unit instructs a second detecting unit to perform detection according to a detection result of the first detecting unit, the second detecting unit being different from the first detecting unit.

4. The electronic device according to claim 3, wherein the instructing unit instructs a third detecting unit to perform detection according to a detection result of the second detecting unit, the third detection unit being different from the first detecting unit and the second detecting unit.

5. The electronic device according to claim 1, wherein the first device further has an output unit, and the instructing unit instructs the output unit to output according to the detection result.

6. The electronic device according to claim 1, wherein the communicating unit is operable to communicate with a second device that is different from the first device.

7. The electronic device according to claim 6, wherein the instructing unit instructs control of the second device according to communication with the first device.

8. The electronic device according to claim 1, comprising a driving unit that is driven according to a detection result of a plurality of detecting units provided to the first device.

9. The electronic device according to claim 8, wherein the driving unit has a vibrating unit.

10. The electronic device according to claim 1, comprising a speed acquiring unit that acquires a walking speed of a user.

11. An electronic device comprising:
a position detecting unit that detects a position of the electronic device;
a time detecting unit that detects a time of the electronic device;
a physical amount detecting unit that detects a physical amount of an ambient environment according to a detection result of the position detecting unit and the time detecting unit;
a human detecting that performs human detection according to a detection result of the physical amount detecting unit; and
the physical amount detecting unit detects brightness that is equal to or lower than a predetermined brightness, and detects a volume that is equal to or lower than a predetermined volume.

12. The electronic device according to claim 11, wherein the physical amount detecting unit detects a physical amount of at least one of brightness and sound.

13. The electronic device according to claim 11, wherein the human detecting unit has at least one of an infrared sensor and an image capturing unit.

14. The electronic device according to claim 11, wherein the physical amount detecting unit is separate from the position detecting unit and the time detecting unit.

15. The electronic device according to claim 11, wherein the human detecting unit is separate from the position detecting unit and the time detecting unit.

16. An electronic device comprising:
a first detecting unit that detects brightness of an ambient condition;
a second detecting unit that detects sound of an ambient condition;
a third detecting unit that detects information for human detection according to a detection result of the first detecting unit and the second detecting unit; and
the first detecting unit detects brightness that is equal to or higher than a predetermined brightness, and the second detecting unit detects a volume that is equal to or higher than a predetermined volume.

17. The electronic device according to claim 16, wherein the third detecting unit detects information for detecting an approach of a human.

18. The electronic device according to claim 16, wherein the third detecting unit has an infrared sensor.

19. The electronic device according to claim 16, wherein the third detecting unit has an image capturing unit.

20. The electronic device according to claims 16, wherein the third detecting unit detects the information for human detection when the first detecting unit detects brightness that is equal to or lower than a predetermined brightness, and the second detecting unit detects a volume that is equal to or lower than a predetermined volume.

21. The electronic device according to claim 16, wherein the third detecting unit detects the information for human detection when there is a predetermined change in brightness detected by the first detecting unit, and there is a predetermined change in sound detected by the second detecting unit.

22. The electronic device according to claim 16, comprising a light emitting unit that emits light according to a detection result of the third detecting unit.

23. The electronic device according to claim 16, comprising a communicating unit that is operable to communicate with an external device.

24. The electronic device according to claim 23, comprising a deleting unit that deletes data communicated by the communicating unit.

25. The electronic device according to claim 23, comprising an engaging part that is attachable to and detachable from the external device.

* * * * *